(12) United States Patent
Subramanian

(10) Patent No.: US 6,512,552 B1
(45) Date of Patent: Jan. 28, 2003

(54) SUBPICTURE STREAM CHANGE CONTROL

(75) Inventor: Pattabiraman Subramanian, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/280,727

(22) Filed: Mar. 29, 1999

(51) Int. Cl.[7] ............................................. H04N 5/448
(52) U.S. Cl. ...................... 348/564; 348/567; 348/474; 348/423.1; 386/98; 386/95; 386/123
(58) Field of Search ................................. 348/564, 565, 348/512, 567, 588, 473, 474, 423.1; 386/98, 125, 126, 95, 37, 84, 123; H04N 5/448

(56) References Cited

U.S. PATENT DOCUMENTS

| | | | | |
|---|---|---|---|---|
| 5,414,471 A | * | 5/1995 | Saitoh et al. | 345/802 |
| 5,847,771 A | * | 12/1998 | Cloutier et al. | 348/564 |
| 5,907,659 A | * | 5/1999 | Yamauchi et al. | 386/125 |
| 5,930,450 A | * | 7/1999 | Fujita | 386/104 |
| 5,959,684 A | * | 9/1999 | Tan et al. | 348/500 |
| 6,088,063 A | * | 7/2000 | Shiba | 348/500 |
| 6,108,486 A | * | 8/2000 | Sawabe et al. | 386/126 |
| 6,249,640 B1 | * | 6/2001 | Takiguchi et al. | 386/125 |
| 6,259,858 B1 | * | 7/2001 | Ando et al. | 386/125 |
| 6,295,094 B1 | * | 9/2001 | Cuccia | 348/559 |
| 6,363,207 B1 | * | 3/2002 | Duruoz et al. | 348/423.1 |
| 6,377,309 B1 | * | 4/2002 | Ito et al. | 348/554 |

\* cited by examiner

*Primary Examiner*—John Miller
*Assistant Examiner*—Linus H Lo
(74) *Attorney, Agent, or Firm*—Wood, Herron & Evans, L.L.P.

(57) ABSTRACT

A method of operating a digital video processor to continuously demultiplex, store and decode audio and video data streams and play back corresponding frames of audio and video. The processor further continuously demultiplexes, stores and decodes a first subpicture data stream and plays back first subpicture data in synchronization with the playback of frames of video data. PTS values associated with SPU's in the first subpicture data stream are continuously stored. The processor then detects a command instructing a transition from a first subpicture data stream to a second subpicture data stream and stores a PTS value associated with a first complete SPU of the second subpicture data stream so that it follows a PTS value associated with a last complete SPU in the first subpicture data stream. The processor then continuously stores PTS values associated with the SPU's in the second subpicture data stream. The first subpicture data stream is played back in synchronization with corresponding frames of video according to the stored PTS values associated with the SPU's of the first subpicture data stream; and the second subpicture data stream is played back in synchronization with corresponding frames of video according to the stored PTS values associated with the SPU's of the second subpicture data stream. The above process is executed without interrupting the continuous decoding and playback of the audio and video data streams.

20 Claims, 5 Drawing Sheets

| SUBPICTURE PTS TABLE | |
|---|---|
| $PTS_0$ | $BA_0$ |
| $PTS_1$ | $BA_1 = BA_0 + BC_1 + BC_2 + BC_3$ |
| $PTS2$ | $BA_2 = BA_1 + BC_4 + BC_5$ |
| $PTS_3$ | $BA_3 = BA_2 + BC_6 + BC_7$ |
| $PTS_4$ | $BA_4 = BA_3 + BC_8 + BC_9$ |
| $PTS_5$ | $BA_5 = BA_4 + BC_{10} + BC_{11}$ |

RP ← $PTS_1$
WP → $PTS_5$

FIG. 5A

| SUBPICTURE PTS TABLE | |
|---|---|
| $PTS_0$ | $BA_0$ |
| $PTS_1$ | $BA_1 = BA_0 + BC_1 + BC_2 + BC_3$ |
| $PTS2$ | $BA_2 = BA_1 + BC_4 + BC_5$ |
| $PTS_3$ | $BA_3 = BA_2 + BC_6 + BC_7$ |
| $PTS_4$ | $BA_4 = BA_3 + BC_8 + BC_9$ |
| $PTS_B$ | $BA_5 = BA_4 + BC_{10} + BC_{11} + BC_{12} + BC_{13} + BC_{21} + BC_{22}$ |

RP ← $PTS_1$
WP → $PTS_B$

FIG. 5B

| SUBPICTURE PTS TABLE | |
|---|---|
| $PTS_0$ | $BA_0$ |
| $PTS_1$ | $BA_1 = BA_0 + BC_1 + BC_2 + BC_3$ |
| $PTS2$ | $BA_2 = BA_1 + BC_4 + BC_5$ |
| $PTS_3$ | $BA_3 = BA_2 + BC_6 + BC_7$ |
| $PTS_B$ | $BA_5 = BA_4 + BC_{10} + BC_{11} + BC_{12} + BC_{13} + BC_{21} + BC_{22}$ |

RP ← $PTS_1$
WP → $PTS_B$

FIG. 5C

SUBPICTURE STREAM CHANGE CONTROL

BACKGROUND OF THE INVENTION

This invention relates to the digital processing of video data to be displayed on a television screen and more particularly, to the processing of a subpicture.

Almost all televisions manufactured today are capable of interfacing with different sources of program materials, for example, a VCR, a digital versatile or video disk ("DVD") player, cable, DSS, etc., that provide audio signals for creating sounds and associated video input signals for creating screen displays. Some of those sources provide digital audio and video input signals in accordance with the Moving Picture Expert Group MPEG-2 audio/video digital compression standard. Further, most televisions and/or their plug compatible program sources have user interactive capabilities with which a user may choose to have the programmed source provide subpicture data for providing a display of captions, subtitles, karaoke or simple animation on the screen along with the program material. Thus, contemporary televisions and/or DVD systems preferably have the capability of processing compressed digital input signals representing audio, video and subpicture data and providing digital output signals representing the desired sound, video and subpicture images. Most often, those digital output signals are converted to analog signals for use by known analog television display units.

The implementation of digital signal processing for providing an audio, video and subpicture display from an audio-video source of programmed material presents numerous design challenges that were not encountered in the prior processing of analog audio and video signals. For example, with digital signal processing, the audio, video and subpicture signals are separated and are processed independently. However, the playback of the audio, video and subpicture must be synchronized, so that there is a coordinated and coherent reproduction of the desired audio, video and subpicture provided from the source of program material.

The source, for example, a video disk, preferably provides the audio and video data in respective data packets in an "MPEG-2" format. Each of the audio, video and subpicture data packets is received from the source of video material in a continuous data stream. Each packet of video data includes a header block followed by a data block. The data block may include any number, for example one to twenty, of frames of video data that may include a full field of video data or be a coded group of pictures that includes its own header block identifying the picture type and display order. The header block for a video data packet includes control information, for example, the identity of the format of the video data, the type of compression, if used, picture size, display order, and other global parameters.

The audio data packet has a header block that again identifies the format of the audio data with instructions relating to how the audio data is to be decoded and processed to provide desired enhancements, if applicable. Following the header block, the audio data packet includes an audio data block that has any number of blocks or frames of audio data, for example, from one to approximately twenty blocks.

The subpicture data may be provided in a data packet in one of several formats. For purposes of this description, it will be assumed that the subpicture data is being provided in a Subpicture format that is defined by the known DVD standard. The Subpicture format includes a header block, a pixel data block, and a display control sequence ("DCSQ") command data block. Generally, the header is used to identify the general nature of the data, for example, the size of the subpicture unit and the location of the DCSQ commands. In the Subpicture format, the pixel data represents color and contrast information and is compressed using known compression techniques, for example, run length compression. The DCSQ command block includes one or more sets of commands that determine color and contrast globally within the subpicture. In addition, DCSQ command data may optionally include a Change Color-Contrast ("CHG_COLCON") command which functions to change the color and contrast within the subpicture on a pixel by pixel basis.

Selected ones of the header blocks of the audio and video data packets and all of the header blocks of the subpicture data packets include a presentation time stamp ("PTS") value which is a time stamp that is applicable to that data packet. The PTS value is a time reference to a system time clock that was running during the creation or recording of the audio and video data. A similar system time clock ("STC") is also running during the playback of the audio and video data, and if the audio, video and subpicture data are played back at the times represented by their presentation time stamps, the audio, video and subpicture data will be presented to the user in the desired synchronized manner. Therefore, the PTS value is used to synchronize the presentation or playback of the audio, video and subpicture data.

During the decoding of the audio data, it normally must be decompressed, reconstructed and enhanced in a manner consistent with the source of program material and the capabilities of the sound reproduction system. In some applications, audio data packets may contain up to six channels of raw audio data. Depending on the number of channels the sound reproduction systems can reproduce, for example, from two to six, the sound reproduction system selectively uses the channels of raw audio data to provide a number of channels of audio which are then stored in an audio FIFO.

The decoding of the video data normally requires decompression, conversion of partial frames into full frames and the recognition of full frames. The decoding of subpicture data requires the decompression of run length compressed bit maps of subpicture data. Simultaneously with the decoding process, audio, video and subpicture data is being played back to the user, and in that playback, the frames of audio and video data are being output and the subpicture is overlaid on top of the program video and the reconstructed audio, video and subpicture must be synchronized in the playback process such that the audio, video and subpicture present a coordinated and coherent presentation.

As will be appreciated from the foregoing, demultiplexing the audio, video and subpicture data packets is a complex process of deconstructing the data packets and storing the necessary decoding instructions as well as the content data itself to permit the decoding and playback of the data in a synchronized manner. One such process, is described in a copending U.S. patent application Ser. No. 08/901,090 entitled Method and Apparatus for Audio-Video Synchronizing, filed on Jul. 28, 1997, now U.S. Pat. No. 5,959,684 and assigned to the assignee of the present application. U.S. patent application Ser. No. 08/901,090 is in its entirety hereby incorporated by reference.

The interactive nature of current entertainment equipment presents additional problems in a synchronized playback of audio, video and subpicture data. For example, subtitles in a language different from the language of the audio are often displayed in the playback of programmed media, for example, a movie on a video disk. A video disk may contain subtitles in up to 32 different languages, and each subtitle language is stored as a subpicture data stream on the video disk. The user has the capability of switching between any of those 32 different languages at any point in time. Switching between different subpicture data streams often results in a temporary distortion in the subpicture display during the switching transition or a temporary loss of synchronization with the video being played.

Consequently, in a video system providing multiple streams of subpicture data, there is a need to provide an improved switching between different streams of subpicture data in response to randomly provided user requests.

SUMMARY OF THE INVENTION

The present invention provides a method and apparatus of a real time smooth transition between different streams of subpicture data without any delay or interference in the presentation of the main audio and video. The present invention has an advantage of utilizing only complete subpicture units in making a transition between first and second subpicture data streams. Thus, there is no partial subpicture displays that may appear as video noise during the transition, and there is no interruption to the presentation of the main audio ad video. The present invention utilizes all valid subpicture units in the first subpicture data stream prior to switching to the subpicture units in the second subpicture data stream, thus playing back the optimum number of multiplexed subpicture units in response to random user requests to change from one subpicture data stream to another and coordinating to the greatest extent possible the subpicture display to the video being played.

In accordance with the principles of the present invention and the described embodiments, the invention provides a method of operating a digital video processor to continuously demultiplex, store and decode audio and video data streams and play back corresponding frames of audio and video. The processor further continuously demultiplexes, stores and decodes a first subpicture data stream and plays back first subpicture data in synchronization with the playback of frames of video data. PTS values associated with SPU's in the first subpicture data stream are continuously stored. The processor then detects a command instructing a transition from the first subpicture data stream to a second subpicture data stream and stores a PTS value associated with a first complete SPU of the second subpicture data stream so that it follows a PTS value associated with a last complete SPU in the first subpicture data stream. The processor then continuously stores PTS values associated with the SPU's in the second subpicture data stream. The first subpicture data stream is played back in synchronization with corresponding frames of video according to the stored PTS values associated with the SPU's of the first subpicture data stream; and the second subpicture data stream is played back in synchronization with corresponding frames of video according to the stored PTS values associated with the SPU's of the second subpicture data stream. Thus, processor provides a transition from the first to the second subpicture data streams without playing back any partial SPU's in either of the first or the second subpicture data streams and without introducing any delay or interference in the presentation of the main audio and video.

In another embodiment of the invention, the above processor determines a PTS value of a first complete SPU in the second subpicture data stream and successively compares the PTS value of the first complete SPU in the second subpicture data stream to the stored PTS values of the complete SPU's in the first subpicture data stream beginning with a most recently stored PTS value. The processor then identifies a closest stored PTS value of the complete SPU's in the first subpicture data stream that immediately precedes the PTS value of the first complete SPU in the second subpicture data stream. Thus, the processor provides a smoother transition from the first to the second subpicture data streams by playing back all possible SPU's in the first subpicture data stream.

These and other objects and advantages of the present invention will become more readily apparent during the following detailed description taken in conjunction with the drawings herein.

BRIEF DESCRIPTION OF THE DRAWINGS

FIGS. 5A–5C are schematic drawings of different states of a subpicture PTS table in response to receipt of a subpicture stream change command.

DETAILED DESCRIPTION OF THE INVENTION

Figure 1:
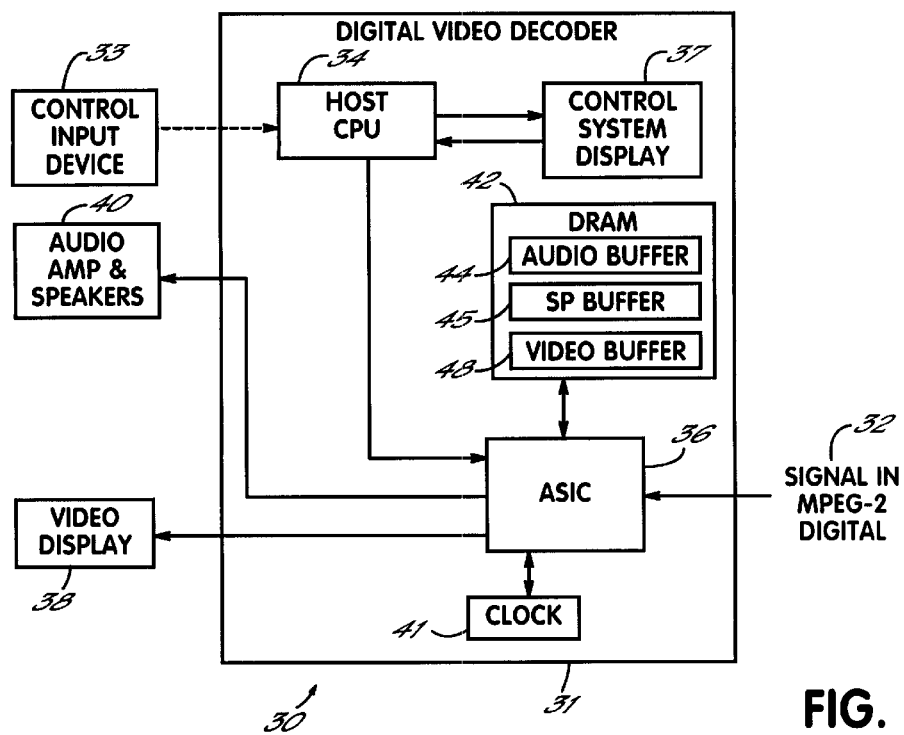
FIG. 1 is a schematic block diagram of a digital audio/video decoder in accordance with the principles of the present invention.

Referring to FIG. 1, one embodiment of the present invention is for use in a DVD audio/video decoder 30 which includes a unit processor 31 with a program signal input 32 from a DVD drive. A central processing unit or host CPU 34 which is programmed to process user commands from a control input device 33 operates a control system display 37 which displays information, menu selections and other information to the user and which may or may not also function as an input device. An Application Specific Integrated Circuit ("ASIC") 36, when provided with configuration and selection information by the host CPU 34, decodes the raw signal from signal input 32 for output to the video and audio presentation devices 38 and 40, respectively. A local system clock 41 and a buffer memory 42 are preferably connected to the ASIC 36. The buffer memory 42 is an in-line, sequential memory, such as dynamic random access or DRAM memory.

Components of the ASIC 36 are further described in commonly-assigned copending U.S. patent application Ser. No. 08/865,749, now U.S. Pat. No. 6,012,137 entitled "SPECIAL PURPOSE PROCESSOR FOR DIGITAL AUDIO/VIDEO DECODING", filed on May 30, 1997 and commonly-assigned, copending U.S. patent application Ser. No. 09/280,437 entitled "VARIABLE LENGTH DECODER FOR DECODING DIGITALLY ENCODED VIDEO SIGNALS", filed on even date herewith, which applications which are hereby incorporated by reference herein in their entirety. A memory controller for use therewith is disclosed in commonly-assigned, copending U.S. patent application Ser. No. 08/846,590, now abandoned, entitled "MEMORY ADDRESS GENERATION FOR DIGITAL VIDEO", filed on Apr. 30, 1997, which is hereby incorporated herein in its entirety. The above-referenced U.S. patent applications describe an application specific integrated circuit (ASIC) for performing digital video processing, which is controlled by a reduced instruction set CPU (RISC CPU). The RISC CPU controls computations and operations of other parts of the ASIC to provide digital video reception. Due to the limitations of the RISC CPU, a task and stack manager procedure is required to monitor task flags, prioritize task flags, manage subroutine calls (the hardware does not support nesting of subroutine calls), and provide virtual instruction memory management. A specific processor of this kind is disclosed in commonly-assigned, copending U.S. patent application Ser. No. 08/866,419, now U.S. Pat. No. 5,928,321 entitled "TASK AND STACK MANAGER FOR DIGITAL VIDEO DECODING", filed on May 30, 1997, which is hereby incorporated by reference herein in its entirety.

Figure 2:
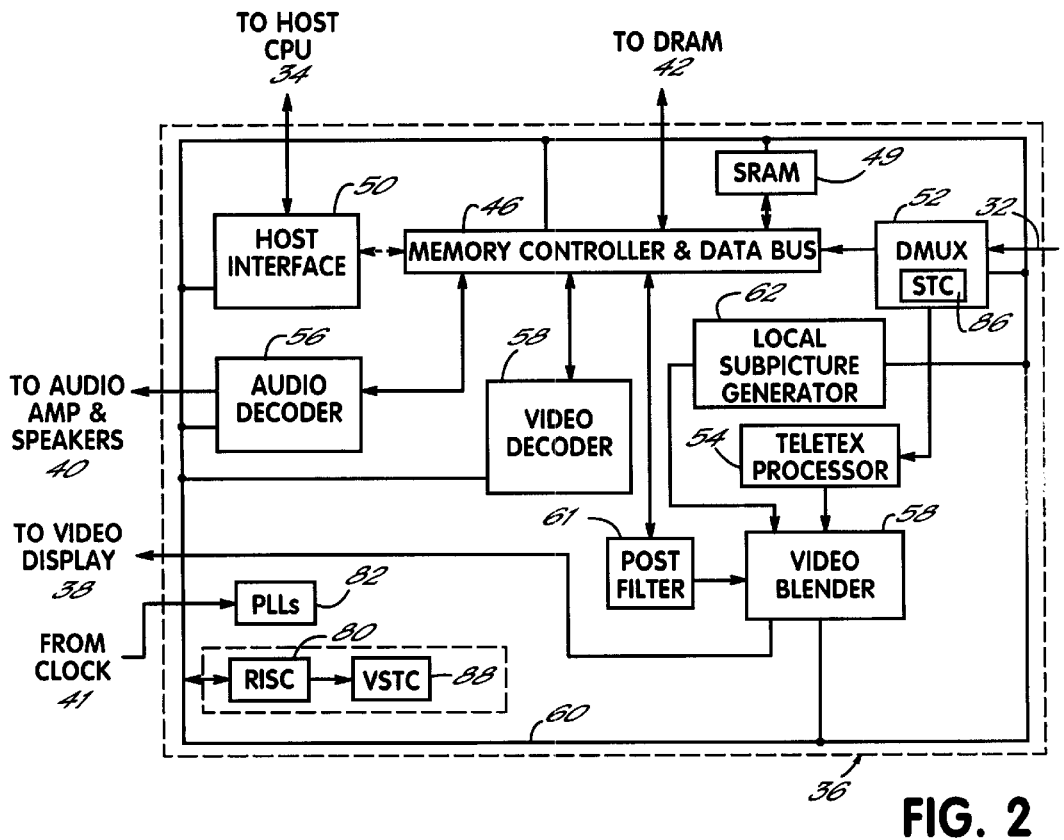
FIG. 2 is a schematic block diagram of an ASIC device within the the audio/video decoder of FIG. 1.

Referring to FIG. 2, the ASIC 36 is a single integrated circuit chip that is logically divided into a number of components or functions. The ASIC 36 includes a memory controller and data bus 46, which provides a plurality of two-way data flow connections. One of the two-way connections is to a static random access memory ("SRAM") 49 of the ASIC 36. Another of the two-way connections is to a host interface unit 50 which connects externally with the host CPU 34, and another is to the DRAM memory module 42 which is external to the ASIC 36. The ASIC 36 includes a demultiplexer or DMUX 52 which has an input connected to the signal input 32 and an output delivering the received data to the bus 46. The DMUX 52 has a text output connected to a teletex processor 54, that is also provided on the ASIC 36 for processing collateral information such as closed caption script and other such data.

The ASIC 36 further includes an audio decoder 56, a video decoder 58 and a subpicture generating unit 62. The audio decoder 56 has an input side connected to the one of the two-way data connections of the bus 46 and an output connected to audio presentation subsystem 40. The video decoder 58 receives video data via the two-way data connections of the bus 46, decodes and otherwise processes the received video data, and sends the decoded and partially processed video picture data back through bus 46 to the DRAM memory 42. This processing preferably includes the application of motion compensation calculations and the construction of B-picture fields from buffered I and/or P frames and received B-picture data.

The subpicture generating unit 62 generates local picture information that includes control menus, display bar-graphs, captions, subtitles, karaoke or simple animation and other indicia used in interaction with the user. Normally, the during the decoding process, video data is supplied from the DRAM 42 to a video blender 58. The video blender 58 combines the program or main video with local video from the subpicture unit 62 and/or with teletex information from the teletex processor 54. The output of the blender 58 is connected to the video presentation subsystem 38.

The ASIC 36 is provided with a control bus (not shown) which is connected to the components in the ASIC 36. The ASIC 36 is also provided with a Reduced Instruction Set Controller "(RISC") 80, which serves as the local CPU of the ASIC 36. The RISC 80 controls the functions of the components of the ASIC 36 through control data ports connected to the control bus. The RISC 80 has a clock input that connects externally of the ASIC 36 to the system clock 41, and has phase locked loop circuitry ("PLL") 82 within the ASIC 36 used to time internal clock signals.

Audio, video and subpicture data packets are received and demultiplexed continuously in independent parallel data streams. The decoding and playback of output frames of audio, video and subpicture data is also performed continuously in parallel data streams independent of the demultiplexing processes. Demultiplexing is a process that varies significantly in real time, depending on the nature of audio, video and subpicture data being received. In addition, the number of video frames to be presented and their order of presentation cannot be determined from the raw video data being received. The creation of video frames and their order of presentation is a function of the decoding process and is determined primarily by the control data in the header portion of the video data packet. Similarly, the raw audio data being received in the data packet bears little resemblance to the audio data output and presented, and the frames of audio data to be presented are created during the decoding process of the audio data. The subpicture data is received in a series of one or more data packets that include display control sequence ("DCSQ") commands each of which has its own start time ("STM") value. A subpicture unit ("SPU") is defined by the subpicture data occurring between subpicture data packets having a presentation time stamp ("PTS") value. The intermediate subpicture data packets contain additional DCSQ command data.

Figure 3:
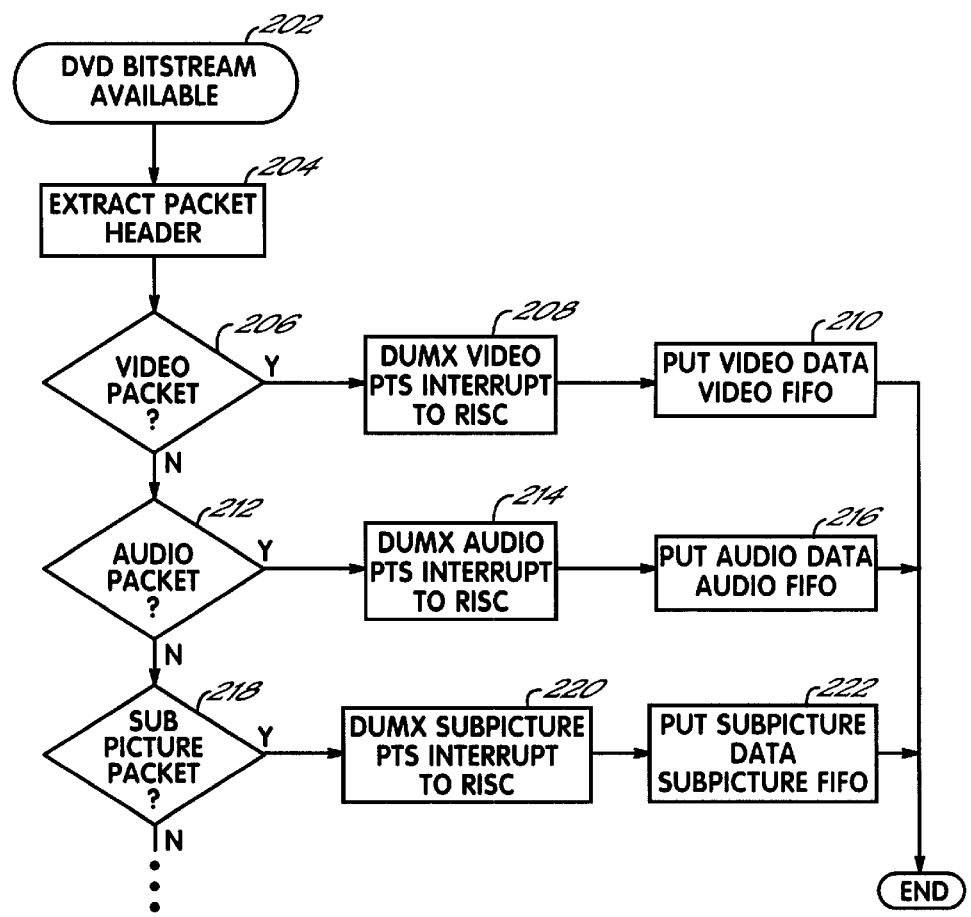
FIG. 3 is a flow chart illustrating the steps of a portion of the demultiplexing process executed by the demultiplexer in accordance with the principles of the present invention.

FIG. 3 is a flow chart illustrating the general operation of the DMUX 52 of FIG. 2. At 202, the input 32 to the DMUX 52 continuously receives a bit stream of data on input 32 containing in random order, audio, video and subpicture data packets. The header block of data is extracted at 204, and video data packets are identified at 206. A video demultiplexing interrupt is provided at 208 to the RISC 80 (FIG. 2); and at 210, the video data is sequentially stored in preferably a contiguous variable length video data buffer, for example, a video first-in, first-out ("FIFO"), 43 in memory 42 (FIG. 1) for use by the ASIC 36 during the video signal processing. In a similar process, audio data packets are identified at 212, and an audio demultiplexing interrupt is provided at 214 to the RISC 80. At 216, the audio data is sequentially stored in an audio data buffer, for example, an audio FIFO, 44 in memory 42 (FIG. 1). Subpicture data packets are identified at 218, and a subpicture demultiplexing interrupt is provided at 220 to the RISC 80. At 222, the subpicture data is sequentially stored in a subpicture data buffer, for example, a subpicture FIFO, 45 in memory 42 (FIG. 1).

The demultiplexing process with respect to the audio, video and subpicture data continues in a manner described in detail in the previously cited pending U.S. patent application Ser. No. 08/901,090 entitled "Method and Apparatus for Audio-Video Synchronizing". As described therein, the DMUX continuously provides audio, video and subpicture PTS interrupts to the RISC 80. While the process of demultiplexing the audio, video and subpicture data continues, a process of decoding and playing back the audio, video and subpicture frames is also running. In this process, there are several different modes of operation by which the audio, video and subpicture data are synchronized. For purposes of the subpicture control, the audio data is selected as the master and the video and subpicture frames are synchronized thereto. The general process of synchronization and the different synchronizing modes is explained in detail in the previously cited U.S. patent application Ser. No. 08/901,090 entitled Method and Apparatus for Audio-Video Synchronizing". The selection of the correct subpicture data to be displayed is performed during the vertical blanking time.

It should be noted that output audio frames can be of any length in real time, and further, several audio frames may be associated with single video frame, or in contrast, a single audio frame may be presented during video produced by several video frames. However, it is required that the frames of audio and video be played back in a synchronized manner to provide a coordinated and coherent presentation to the user. To facilitate the coordination of the presentation of the frames of audio and video data, selected ones of the audio and video data packets contain a PTS value, which is a time reference to a system counter that was running during the creation or recording of the audio and video data. A similar system time clock ("STC") is maintained and clocked in real time, for example, in register 86, by the DMUX 52; and during the demultiplexing process, audio, video and subpicture PTS values are stored in respective PTS tables. During the standard decoding and playback, the audio and video PTS values in the tables are compared to the STC times; and when a PTS value is equal to or less than the STC time, the respective audio, video and subpicture data is read from memory, decoded and played at a time and in a sequence that conforms to the how the data was recorded on the DVD.

With respect to the subpicture data, the RISC 80 decodes the DCSQ commands in the subpicture during the vertical blanking period, that is, with each vertical synchronization period ("fid"). The decoding of the subpicture DCSQ commands is initiated by the RISC 80 when the PTS values in each SPU and the STM values associated with each DCSQ command in intermediate subpicture data packets is less than the time values in the STC. Upon determining the appropriate DCSQ command to be executed, the RISC 80 provides first command data, for example, subpicture location data and color and contrast data to the subpicture generator 62 and further initiates the transfer of subpicture pixel data from memory 42 to the subpicture generator 62. The RISC 80 further causes the pixel data for the video to be sequentially provided from the memory 42 to the video blender 58. Simultaneously therewith, the subpicture generator 62 provides, if appropriate, subpicture pixel data to the video blender 58. The video blender 58 utilizes a known process, for example, a mixing process, to mix the subpicture pixels with the video pixels from memory 42 and produce the desired mixed or blended video data. The blended video data is then encoded in accordance with a desired standard, for example, a NTSC or PAL standard; and thereafter, the encoded video data is converted to an analog signal and displayed on a display unit 38.

Figure 4:
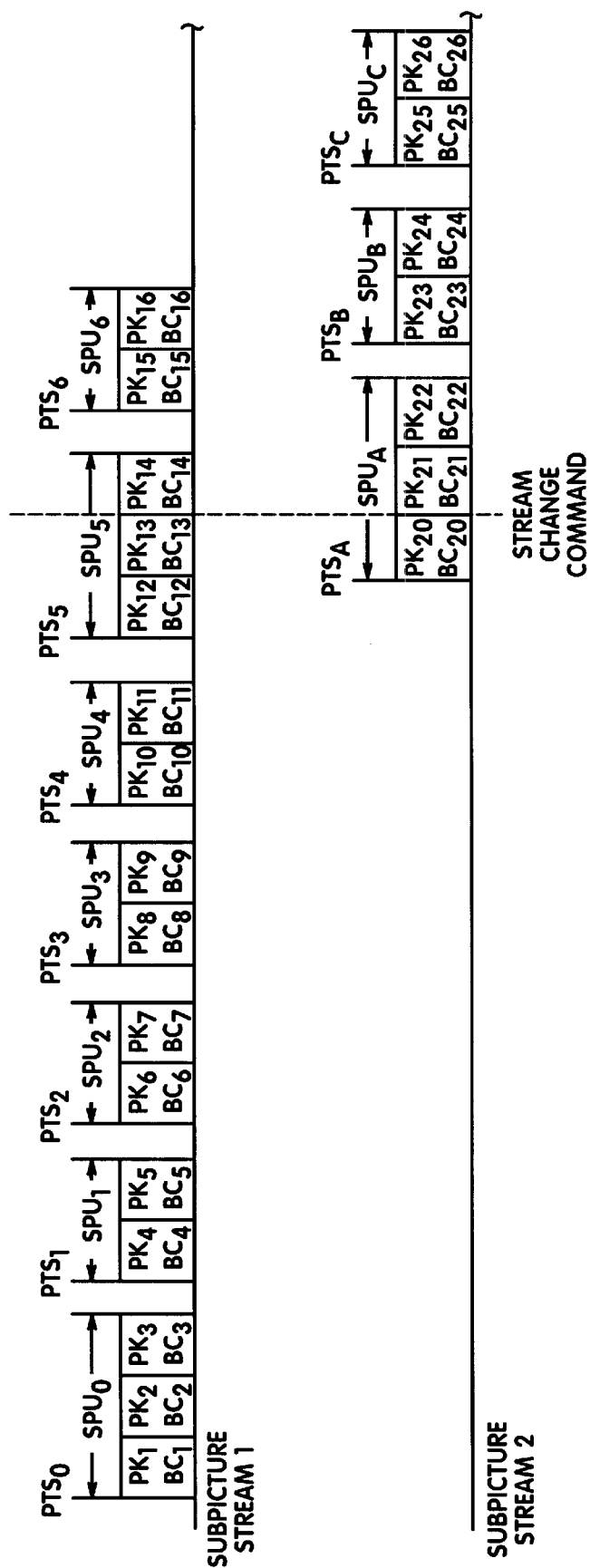
FIG. 4 is a schematic drawing of two streams of subpicture data to illustrate the effect of a subpicture stream change command.

FIG. 4 illustrates two streams of subpicture data. The subpicture data of stream 1 is comprised of a series of subpicture units $SPU_0$, $SPU_1$, $SPU_2$, etc. Each subpicture unit includes one or more packets of subpicture data and an associated PTS value. Under normal conditions, the packets of subpicture data are decoded and displayed in the order in which they are processed by the DMUX. However, as previously described, the user has the capability of using the input device 33 (FIG. 1) to command a transition from one subpicture display to another, for example, to display subtitles in a different language. That command is detected by the host CPU 34 and passed on to the ASIC 36 which changes the identity of the subpicture data stream in the DMUX 52. Such a user initiated switching point is represented in FIG. 4 by the stream change command line intersecting both streams 1 and 2. In responding to the stream change command, the system must execute a transition of the subpicture data from stream 1 to stream 2 as smoothly as possible with minimum distortion while maintaining synchronization with the video.

As will be appreciated, the video data associated with the subpicture streams is being demultiplexed and written into a subpicture FIFO 45 in the memory 42. Simultaneously, the video data is also being read from the subpicture FIFO 45 for decoding and display. Most often and desirably, there is a time difference between the steps of writing the subpicture data into and thereafter, reading the subpicture data from, the FIFO 45. For example, as illustrated in FIG. 4, the stream change command may occur after storing packet $PK_3$ of $SPU_5$ but before demultiplexing packet $PK_{14}$. As a result of the stream change command, the DMUX 52 will then be demultiplexing subpicture packet $PK_{21}$ of subpicture unit $SPU_A$. However, at the time the stream change command occurs, the decoding process may be reading the subpicture unit $SPU_1$ associated with $PTS_1$ from the subpicture FIFO 45.

One method of executing the transition from stream 1 to stream 2 is to sequentially decode all of the subpicture data packets up through packet $PK_{13}$ of $SPU_5$ and then jump immediately to the packet $PK_{21}$, of $SPU_A$. While such a process has the advantage of requiring no special handling of the subpicture data, it has the significant disadvantage of attempting to show incomplete subpicture units which results in substantial distortion and a garbled subpicture display at the point of the transition from stream 1 to stream 2. Further, because the PTS values in stream 2 do not exactly follow the PTS values in stream 1, the subpicture of stream 2 may be out of synchronization with the video. A second approach is to finish the decoding of $SPU_1$ and then jump immediately to decode $SPU_B$. While that method has less distortion than the method previously described, it has the disadvantage of potentially not using all of the subpicture data from stream 1 that has been demultiplexed and stored.

A better method of switching from subpicture stream 1 to subpicture stream 2 is to display complete SPU's of stream 1 up to the PTS of the first complete SPU in stream 2. For example, if the $PTS_B$ value of $SPU_B$ is greater than the value of $PTS_3$ but less than the value of $PTS_4$, then $SPU_B$ should be read and decoded after $SPU_3$. That method provides the optimal transition from subpicture stream 1 to subpicture stream 2 and best coordinates the display of subpicture data with the video being played.

Figure 6:
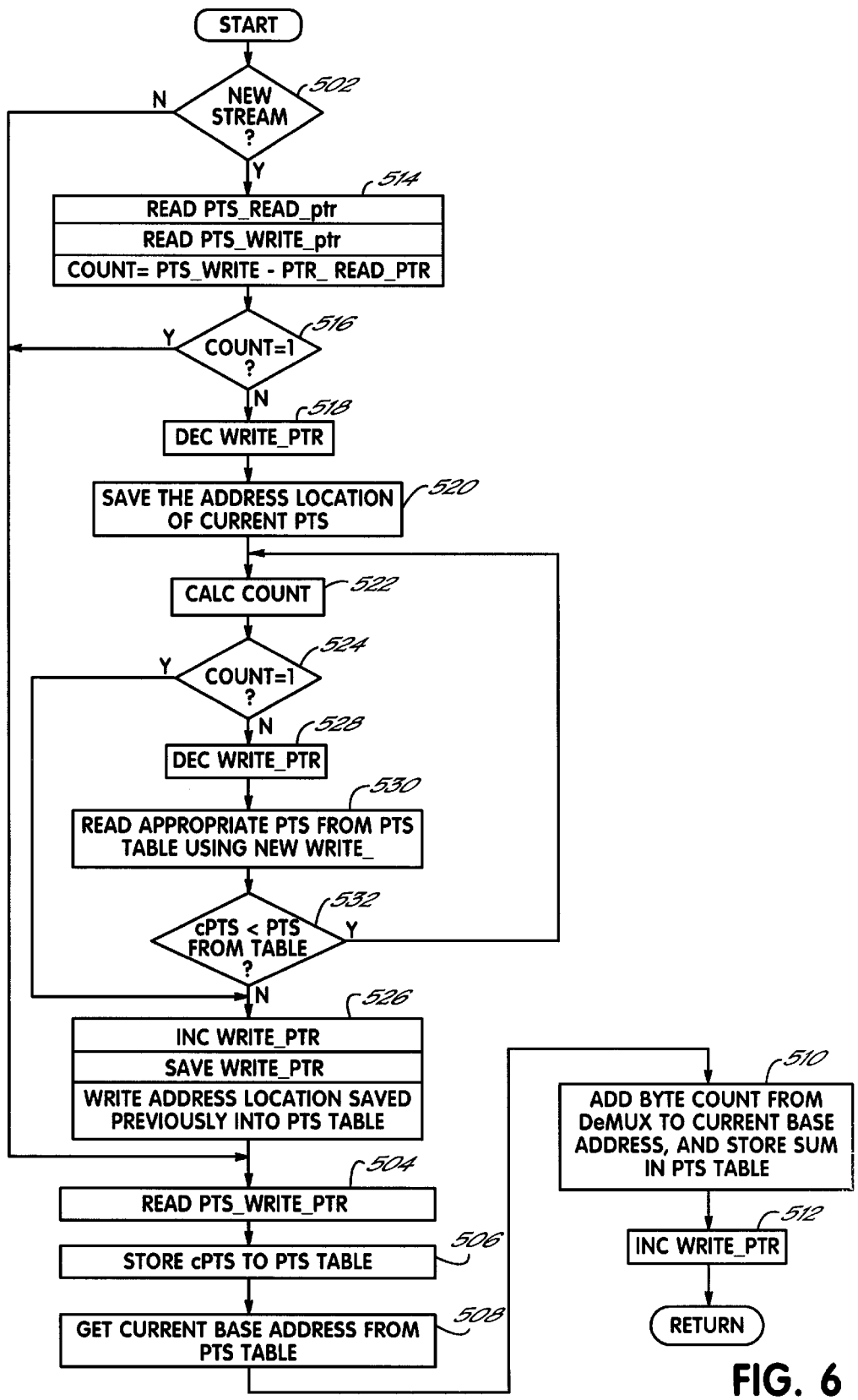
FIG. 6 is a flow chart illustrating the steps in the process of a subpicture master control in accordance with the principles of the present invention.

The above preferred subpicture stream change method is implemented by the RISC 80 creating a subpicture PTS table in memory 42 as illustrated in FIG. 5A. The subpicture PTS table is a buffer that stores successive PTS values associated with successive SPU's. With each PTS value, the RISC 80 also stores an associated base address which identifies the location of the associated SPU in the memory 42. Thus, the subpicture PTS table values are used to determine when an SPU is to be played and where the SPU data is located in memory. Every time the DMUX 52 receives a subpicture PTS value, it sends a subpicture PTS interrupt to the RISC 80, and the subroutine illustrated in FIG. 6 is executed. The subroutine first at 502, tests whether a stream change command has been received. Assuming that the DMUX 52 has detected $PTS_0$ and there is no stream change command, the subroutine then reads the PTS write pointer at 504, and the current PTS value, that is, $PTS_0$, is stored in the subpicture PTS table of FIG. 5A. Thereafter, at 508, the subroutine of FIG. 6 reads the current base address from the PTS table, and at 510, the byte count from the DMUX 52 is added to the base address and the sum stored in the PTS table. In the present case, $PTS_0$, is the first PTS; and therefore, the byte count is 0. The subroutine then increments the write pointer at 512 so that it is now located at the second location in the subpicture PTS table of FIG. 5A.

When the DMUX 52 detects the next PTS, that is, $PTS_1$, another PTS interrupt is provided from the DMUX to the RISC 80, and the subroutine of FIG. 6 is again executed. As previously described, the subroutine at 506 writes the value of $PTS_1$, in the second location of the PTS table. Thereafter, at 508, the current base address, that is, $BA_0$, is read from the PTS table. At 510, the byte counts $BC_1$–$BC_3$ detected by the DMUX 52 in processing the subpicture data packets $PK_1$–$PK_3$ are added to the current base address, and the sum is stored in the PTS table as base address $BA_1$. Thereafter, the write pointer is incremented to the third table location at 512. The subroutine of FIG. 6 iterates as described above in processing subpicture data stream 1 through subpicture unit SPU 4.

In summary, as the DMUX 52 processes the packets within a subpicture unit, it detects the byte count for each packet. Thus, the PTS table is used to store the PTS value for a subpicture unit and in addition, the base address for that subpicture unit, that is, the address within the subpicture FIFO 45 at which the video data associated with a packet is stored. Therefore, upon playback, when the presentation time stamp for a subpicture unit is equal to the system time clock, the base address which is a summation of the byte counts may be used to direct the read pointer to read that subpicture unit video data from subpicture FIFO 45.

During the processing of $SPU_5$, the DMUX 52 detects the stream change command initiated by the user. As a result, after the DMUX 52 processes $PK_{12}$ and $PK_{13}$ of $SPU_5$, it will then receive and process $PK_{21}$, and $PK_{22}$ of $SPU_A$. The net result is that the system has demultiplexed video data for two incomplete subpicture units $SPU_5$ and $SPU_A$. Consequently, if the system attempted to display those subpicture units, the video would appear as being incomplete and discontinuous during the subpicture display. Therefore, it is desirable that $SPU_5$ and $SPU_A$ not be displayed and be skipped in the playback process. Further, it is desirable that $SPU_B$ be displayed at the appropriate time with respect to the other stored subpicture units $SPU_0$–$SPU_4$. Thus, the system must determine the value of $PTS_B$ with respect to the values of the $PTS_0$–$PTS_4$; and if $PTS_B$ is less than $PTS_4$, $PTS_4$ should be skipped.

It should be noted that upon the DMUX 52 detecting a stream change command, the DMUX 52 will have also determined the value of $PTS_B$ and will have accumulated the sum of the byte counts $BC_{12}$, $BC_{13}$, $BC_{21}$, $BC_{22}$. Further, at the time of detecting the stream change command, the subpicture PTS table will be filled as indicated in FIG. 5A with the write pointer at the seventh table location, but the values for the seventh table location yet to be determined. Upon detecting a stream change command at 502, the subroutine of FIG. 5 then at 514, determines the relative locations and separation of the PTS read and write pointers. If at 516, the read and write pointers are determined to be at immediately adjacent locations within the PTS table, then there can be no optimizing of the stream change process. There can be no interruption to the display of video data, and therefore, when the pointers are immediately adjacent each other, there is no opportunity to modify the PTS table. Under those circumstances, the $PTS_B$ and the associated detected byte counts through $BC_{22}$ will be written into the seventh location of the table and the incomplete subpicture units $SPU_5$ and $SPU_A$ will be played with the resulting discontinuities.

Under normal circumstances, the PTS write pointer is significantly ahead of the read pointer in the subpicture PTS table, and therefore, the subpicture optimization can occur. Assume the write pointer is at the seventh table location and the read pointer is at the second table location, thereby providing a significant separation between the read and write pointers. The write pointer is decremented at 518 to the sixth table location; and at 520, a reference base address location, that is, $BA_5$ for $PTS_5$, is saved. Once again, the location of the read pointer with respect to the write pointer is tested at 522, 524; and if it is determined that the read and write pointers are immediately adjacent each other, then the write pointer is incremented to the sixth table location and the saved base address $BA_5$ is saved in its original location in the table. Thereafter, at steps 504–510, $PTS_B$ is written into the sixth table location, and the byte counts are added to the base address $BA_5$. The resulting subpicture PTS table is illustrated in FIG. 5B. Thus, on playback, the subpicture stream 1 is played through subpicture unit $SPU_4$ including $PK_{10}$ and $PK_{11}$. Thereafter, upon $PTS_B$ being equal to the system time clock, the read pointer in the video data memory will jump to start of $SPU_B$ and begin playing video data associated with $PK_{23}$. The net effect of decrementing the write pointer twice at 518 and 528 is to skip $SPU_5$, and $SPU_A$, thereby eliminating the playback of incomplete SPU's that would present a garbled display of subpicture.

If, at 524, it is determined that the pointers are not immediately adjacent each other, the write pointer is again decremented at 528 to the fifth table location $PTS_4$. Thereafter, at 530, 532, the value of $PTS_4$ is read from the table and compared to the current PTS, that is, $PTS_B$. If at 532, the subroutine detects that $PTS_B$ is not less than $PTS_4$, the process increments the write pointer to the sixth table location, and the previously saved base address $BA_5$ is written thereto. The subroutine then in steps 504–510, completes the filling of the sixth table location to provide a stream change in PTS table as illustrated in FIG. 5B.

If at 532, the subroutine determines that $PTS_B$ is less than $PTS_4$, the subroutine at 522, 524, tests for the location of the PTS table read pointer, and if it is not immediately adjacent the write pointer, the write pointer is again decremented at 528 to the fourth table location. Thereafter, at 532, if it is determined that $PTS_B$ is not less than $PTS_3$, the write pointer is incremented at 526 and the saved reference base address $BA_5$ is written into the fifth table location. The routine at 504–510 continues to store $PTS_B$ at the fifth table location along with its associated byte count. The write pointer is incremented at 512 and the net result is a subpicture PTS table as illustrated in FIG. 5C. With that table, after the subpicture $SPU_3$ is played, when the $PTS_B$ equals the system time clock, the subpicture unit $SPU_B$ will be played. Thus, subpicture units $SPU_4$, $SPU_5$, and $SPU_A$ are skipped.

In use, with the above system, only complete subpicture units are displayed, and further, if the stream change is detected, all of the multiplexed and stored subpicture units are tested against the first subpicture unit in the new stream; and the new stream is played at the appropriate time so that it is synchronized with the video. Further, the optimal number of SPU's are displayed without having to manipulate the subpicture data in the video FIFO 45 in DRAM 42 where all of the demultiplexed subpicture data is stored. However, by detecting the relative PTS values between the first complete SPU of the next stream and the complete SPU's of the old stream and modifying the subpicture PTS table, the optimal subpicture data is read from the subpicture FIFO 45. Further, the above process is executed with the simultaneous real time playback of the audio and video, and the transition from one subpicture stream change to another occurs without introducing any delay, noise or interference with the continuous real time playback of the main audio and video.

It should be further noted that in the subpicture PTS tables of FIGS. 5A–5C, the read pointer is shown to be at a constant position. As will be appreciated, the write and read pointers are constantly moving as a function of the independent and respective multiplexing and decoding processes. Therefore, the separation between the read and write pointers is also constantly changing.

While the invention has been illustrated by the description of a preferred embodiment and while the embodiment has been described in considerable detail, there is no intention to restrict nor in any way limit the scope of the amended claims to such detail. Additional advantages and modifications will readily appear to those who are skilled in the art. For example, at 532 of FIG. 6, the subroutine requires that the current PTS be less than the PTS table value in order for the subroutine to test the next lower value in the PTS table. In other words, if the first PTS value in the second subpicture data stream is equal to the PTS value of the first subpicture data stream stored in the table, the table value is given priority; and the SPU in the first subpicture data stream associated with the stored PTS value will be played back.

As will be appreciated, action can be taken with respect to the current PTS in the second subpicture data stream in response to other relationships to the stored PTS table values. For example, the test at 532 in FIG. 6 may be changed to test whether the current PTS in the second subpicture data stream is equal to or less than the stored PTS table value. In that embodiment, the first PTS in the second subpicture data stream is given priority and the stored PTS value from the first subpicture data stream is replaced and not played back. In playing back the subpicture, generally, it is not particularly important that a subpicture be precisely identified with a particular frame of video. Therefore, there is a certain latitude in choosing exactly when to play back the subpicture; and a particular relationship used is generally a matter of design choice. For ease of implementation, it is more important, that whatever relationship is chosen, that it be used for all such comparisons.

Therefore, the invention in its broadest aspects is not limited to the specific details shown and described. Consequently, departures may be made from the details described herein without departing from the spirit and scope of the claims which follow.

What is claimed is:

1. A method of operating a digital video processor in response to audio, video and subpicture data streams, the digital video processor including a CPU and a memory and the subpicture data streams comprising a serial stream of subpicture units ("SPU's") wherein a start of each of the SPU's has a presentation time stamp ("PTS") associated therewith, the method comprising:
    continuously demultiplexing, storing and decoding the audio and video data streams and playing back corresponding frames of audio and video;
    continuously demultiplexing, storing and decoding a first subpicture data stream and playing back first subpicture data in synchronization with the playback of frames of video data;
    continuously storing PTS values associated with SPU's in the first subpicture data stream;
    detecting a command instructing a transition form the first subpicture data stream to a second subpicture data stream;
    storing a PTS value associated with a first complete SPU of the second subpicture data stream so that it follows a PTS value associated with a last complete SPU in the first subpicture data stream;
    continuously storing PTS values associated with the SPU's in the second subpicture data stream;
    playing back the first subpicture data stream in synchronization with corresponding frames of video according to the stored PTS values associated with the SPU'of the first subpicture data stream; and
    playing back the second subpicture data stream in synchronization with corresponding frames of video according to the stored PTS values associated with the SPU's of the second subpicture data stream, thereby providing a transition from the first to the second subpicture data streams without playing back any partial SPU's in either of the first or the second subpicture data streams and without any interruption to the continuous demultiplexing, storing and decoding of the audio and video data streams.

2. A method of claim 1 further comprising continuously storing with each stored PTS value associated with SPU's in both the first and the second subpicture data streams a memory location of the current PTS value being stored.

3. A method of claim 1 further comprising continuously storing with each stored PTS value associated with SPU's in both the first and the second subpicture data streams a number of bytes from an immediately preceding memory location storing a PTS value to a memory location of the current PTS value being stored.

4. A method of claim 1 further comprising:
    determining a PTS value of a first complete SPU in the second subpicture data stream;
    successively comparing the PTS value of the first complete SPU in the second subpicture data stream to the stored PTS values of the complete SPU's in the first subpicture data stream beginning with a most recently stored PTS value; and
    identifying a closest stored PTS value of the complete SPU's in the first subpicture data stream that immediately precedes the PTS value of the first complete SPU in the second subpicture data stream.

5. A method of claim 1 further comprising detecting a PTS value of the first complete SPU in the second subpicture data stream being greater than the stored PTS values of the complete SPU's in the first subpicture data stream to identify the closest stored PTS value of the complete SPU in the first picture data stream.

6. A method of claim 1 further comprising detecting a PTS value of the first complete SPU in the second subpicture data stream being greater than or equal to the stored PTS values of the complete SPU's in the first subpicture data stream to identify the closest stored PTS value of the complete SPU in the first picture data stream.

7. A method of operating a digital video processor in response to audio, video and subpicture data streams, the digital video processor including a CPU and a memory and the subpicture data streams comprising a serial stream of subpicture units ("SPU's") wherein a start of each of the SPU's has a presentation time stamp ("PTS") associated therewith, the method comprising:
    continuously demultiplexing, storing and decoding the audio and video data streams and playing back corresponding frames of audio and video;
    continuously demultiplexing, storing and decoding a first subpicture data stream and playing back first subpicture data in synchronization with the playback of frames of video data;
    continuously storing PTS values associated with SPU's in the first subpicture data stream;

detecting a command instructing a transition from the first subpicture data stream to a second subpicture data stream;

determining a PTS value of a first complete SPU in the second subpicture data stream;

comparing the PTS value of the first complete SPU in the second subpicture data stream to the stored PTS values of the complete SPU's in the first subpicture data stream;

identifying a closest stored PTS value of the complete SPU's in the first subpicture data stream that immediately precedes the PTS value of the first complete SPU in the second subpicture data stream;

storing the PTS value associated with the first complete SPU of the second subpicture data stream so that it follows the closest stored PTS value associated with a last complete SPU in the first subpicture data stream;

continuously storing other PTS values associated with the SPU's in the second subpicture data stream;

playing back the SPU's in the first subpicture data stream up through the SPU having the closest PTS value in synchronization with corresponding frames of video according to the stored PTS values associated with the SPU's of the first subpicture data stream and up through the closest PTS value; and playing back the second subpicture data stream starting with the first complete SPU in synchronization with corresponding frames of video according to the stored PTS values associated with the SPU's of the second subpicture data stream, thereby providing a smooth transition from the first to the second subpicture data streams without interfering with the continuous demultiplexing, storing and decoding the audio and video data streams and playing back of corresponding frames of audio and video.

8. A method of operating a digital video processor including a CPU and a memory to change from a first subpicture data stream to a second subpicture data stream, each of the first and second subpicture data streams comprising a respective serial stream of subpicture units ("SPU's"), a start of each of the SPU's having a presentation time stamp ("PTS") associated therewith, the method comprising:

creating a subpicture PTS table in the memory for storing successive PTS values for successive SPU's in the first subpicture data stream and respective associated byte counts including a number of bytes between successive SPU's;

detecting a command requesting a change from the first to the second subpicture data stream;

comparing a first PTS value in the second subpicture data stream to the PTS values of the first subpicture data stream stored in the subpicture PTS table;

storing the first PTS value in the second subpicture data stream in a subpicture PTS table location having a first stream PTS value greater than the first PTS value in the second subpicture data stream; and storing in a location in the subpicture PTS table associated with the first PTS value in the second subpicture data stream a byte count representing the sum of all of the byte counts in the first and second subpicture data streams demultiplexed up to the first PTS value in the second subpicture data stream.

9. The method of claim 8 further comprising storing the first PTS value in the second subpicture data stream in a subpicture PTS table location having a first stream PTS value greater than or equal to the first PTS value in the second subpicture data stream.

10. The method of claim 8 further comprising:

receiving a PTS interrupt from a demultiplexer in response to the demultiplexer processing a current SPU;

testing whether the command requesting a change from the first to the second subpicture data stream has been received;

writing a current PTS value associated with the current SPU in the subpicture PTS table in response to determining that the command has not been received;

determining a current byte count including a number of bytes from a start of a prior SPU to the first SPU;

reading a base address in byte counts from the subpicture PTS table associated with the prior SPU, the base address identifying a location of subpicture data in the memory associated with the prior SPU;

combining the current byte count with the base address to form a current base address identifying a location of subpicture data in memory associated with the current SPU; and writing the current base address into a location in the subpicture PTS table associated with the current PTS value of the current SPU.

11. The method of claim 10 wherein the subpicture PTS table has a read pointer and a write pointer, the method further comprising:

comparing the locations of the read and write pointers in the subpicture PTS table in response to determining that the command requesting a change from the first to the second subpicture data stream has been received;

decrementing the write pointer one location within the subpicture PTS table in response to the read and write pointers not being at adjacent locations within the subpicture PTS table;

saving a reference base address associated with a current location of the write pointer;

comparing again the locations of the read and write pointers in the subpicture PTS table;

decrementing the write pointer another location within the subpicture PTS table in response to the read and write pointers again not being at adjacent locations within the subpicture PTS table; and comparing another PTS value from the first subpicture in response stored in the other location in the subpicture PTS table with the first PTS value in the second subpicture data stream.

12. The method of claim 11 further comprising:

writing the reference base address at the other location of the subpicture PTS table in response to the value of the current PTS not being less than the first PTS value in the second subpicture data stream;

incrementing the write pointer to the one location in the subpicture PTS table; and writing in the one location of the subpicture PTS table, the value of the first PTS value in the second subpicture data stream and a base address value equal to a sum of the reference base address and a number of byte counts detected from the reference base address to the first PTS value in the second subpicture data stream.

13. The method of claim 12 comprising:

comparing again the locations of the read and write pointers in the subpicture PTS table in response to the value of the first PTS value in the second subpicture data stream being less than the other PTS value;

decrementing the write pointer a further location within the subpicture PTS table in response to the read and write pointers again not being at adjacent locations within the subpicture PTS table; and comparing a further PTS value from the first subpicture data stream stored in the other location in the subpicture PTS table with a value of the first PTS value in the second subpicture data stream.

14. The method of claim 13 further comprising iterating the methods of claims 5 and 6 for all PTS values in the subpicture PTS table that are greater than the first PTS value in the second subpicture data stream.

15. The method of claim 14 further comprising iterating the methods of claims 5 and 6 for all PTS values in the subpicture PTS table that are greater than or equal to the first PTS value in the second subpicture data stream.

16. A method of operating a digital video processor including a CPU and a memory to change from one subpicture data stream to a second subpicture data stream, each of the first and second subpicture data streams comprising a respective serial stream of subpicture units ("SPU's"), a start of each of the SPU's being defined by a presentation time stamp ("PTS") associated therewith, the method comprising:

creating a subpicture PTS table in the memory for storing successive PTS values for successive SPU's in the first subpicture data stream and respective associated byte counts including a number of bytes between successive SPU's;

detecting a command requesting a change from the first to the second subpicture data stream;

comparing the locations of the read and write pointers in the subpicture PTS table in response to determining that the command has been received;

decrementing the write pointer in the subpicture PTS table through successive locations in the subpicture PTS table in response to the read and write pointers not being in adjacent locations in the subpicture PTS table with each decrement of the write pointer;

with each decrement of the write pointer, comparing a first PTS value in the second subpicture data stream to a PTS value associated with a current location of the write pointer;

storing the first PTS value in the second subpicture data stream in the subpicture PTS table location having a first stream PTS value greater than the first PTS value in the second subpicture data stream; and storing in a location in the subpicture PTS table associated with the first PTS value in the second subpicture data stream a byte count representing the sum of all of the byte counts in the first and second subpicture data streams demultiplexed up to the first PTS value in the second subpicture data stream.

17. The method of claim 16 further comprising storing the first PTS value in the second subpicture data stream in the subpicture PTS table location having a first stream PTS value greater than or equal to the first PTS value in the second subpicture data stream.

18. A method of operating a digital video processor including a CPU and a memory to change from one subpicture data stream to a second subpicture data stream, each of the first and second subpicture data streams comprising a respective serial stream of subpicture units ("SPU's"), each of the SPU's having a presentation time stamp ("PTS") associated therewith, the method comprising:

demultiplexing the first subpicture data stream including first stream PTS values;

storing successive first stream PTS values in successive locations in a PTS table in the memory;

storing in locations in the PTS table associated with each of the first stream PTS values a respective byte count including a sum of byte counts between successive SPU's in the first subpicture data stream;

detecting a command requesting a change from the first to the second subpicture data stream;

demultiplexing the second subpicture data stream including second stream PTS values;

comparing a first second stream PTS value to first stream PTS values stored in the PTS table;

storing the first second stream PTS value in a PTS table location having a first stream PTS value greater than the first second stream PTS value; and storing in a location in the PTS table associated with the first second stream PTS value stream a byte count including a sum of all of the byte counts in the first and second subpicture data streams demultiplexed up to the first second stream PTS value.

19. The method of claim 18 further comprising storing the first second stream PTS value in a subpicture PTS table location having a first stream PTS value greater than or equal to the first second stream PTS value.

20. A digital video processor being responsive to audio, video and subpicture data streams, the subpicture data streams comprising a serial stream of subpicture units ("SPU's") wherein a start of each of the SPU's has a presentation time stamp ("PTS") associated therewith, the processor comprising:

a demultiplexer for continuously demultiplexing the audio and video data streams and subpicture data streams;

a memory electrically connected to the demultiplexer for storing demultiplexed audio and video data and demultiplexed subpicture data, the memory further storing PTS values associated with SPU's in a first subpicture data stream;

a CPU electrically connected to the memory and the demultiplexer for detecting a command requesting a transition from a first subpicture data stream to a second subpicture data stream, the CPU controlling the demultiplexer and the memory to store a PTS value associated with a first complete SPU of the second subpicture data stream so that it follows a PTS value associated with a last complete SPU in the first subpicture data stream and thereafter continuously storing PTS values associated with the SPU's in the second subpicture data stream;

a decoder electrically connected to the CPU and the memory for decoding the demultiplexed audio and video data and continuously playing back corresponding frames of audio and video;

a subpicture generator and blender electrically connected to the CPU, the decoder and the memory and responsive to the demultiplexed subpicture data streams for playing back the first subpicture data stream in synchronization with corresponding frames of video according to the stored PTS values associated with the SPU's of the first subpicture data stream and also playing back the second subpicture data stream in synchronization with corresponding frames of video according to the stored PTS values associated with the SPU's of the second subpicture data stream, thereby providing a transition from the first to the second subpicture data streams without playing back any partial SPU's in either of the first or the second subpicture data streams and without any interruption to the continuous demultiplexing, storing and decoding of the audio and video data streams.

* * * * *

UNITED STATES PATENT AND TRADEMARK OFFICE
CERTIFICATE OF CORRECTION

PATENT NO. : 6,512,552 B1
DATED : January 28, 2003
INVENTOR(S) : Subramanian

It is certified that error appears in the above-identified patent and that said Letters Patent is hereby corrected as shown below:

Column 3,
Line 27, reads "audio ad video" and should read -- audio and video --.

Column 4,
Line 66, reads "which applications which are" and should read -- which applications are --.

Column 5,
Line 54, reads "Normally, the during the" and should read -- Normally, during the --.
Line 64, reads "Controller "(RISC") 80," and should read -- Controller ("RISC") 80, --.

Column 6,
Line 65, reads "entitled Method and" and should read -- entitled "Method and --.

Column 7,
Line 22, reads "conforms to the how the" and should read -- conforms to how the --.

Column 8,
Line 9, reads "$PK_3$" and should read -- $PK_{13}$ --.

Column 11,
Line 11, reads "restrict nor in any" and should read -- restrict or in any --.
Line 11, reads "scope of the amended claims" and should read -- scope of the appended claims --.
Line 6 , reads "transition form the first" and should read -- transition from the first --.

UNITED STATES PATENT AND TRADEMARK OFFICE
CERTIFICATE OF CORRECTION

PATENT NO.   : 6,512,552 B1
DATED        : January 28, 2003
INVENTOR(S)  : Subramanian It is certified that error appears in the above-identified patent and that said Letters Patent is hereby corrected as shown below:

<u>Column 12,</u>
Line 5, reads "SPU' of the" and should read -- SPU's of the --.

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,512,552 B1
DATED         : January 28, 2003
INVENTOR(S)   : Subramanian Page 1 of 2

It is certified that error appears in the above-identified patent and that said Letters Patent is hereby corrected as shown below:

Column 3,
Line 27, reads "audio ad video" and should read -- audio and video --.

Column 4,
Line 66, reads "which applications which are" and should read -- which applications are --.

Column 5,
Line 54, reads "Normally, the during the" and should read -- Normally, during the --.
Line 64, reads "Controller "(RISC") 80," and should read -- Controller ("RISC") 80, --.

Column 6,
Line 65, reads "entitled Method and" and should read -- entitled "Method and --.

Column 7,
Line 22, reads "conforms to the how the" and should read -- conforms to how the --.

Column 8,
Line 9, reads "$PK_3$" and should read -- $PK_{13}$ --.

Column 11,
Line 11, reads "restrict nor in any" and should read -- restrict or in any --.
Line 11, reads "scope of the amended claims" and should read -- scope of the appended claims --.
Line 61, reads "transition form the first" and should read
-- transition from the first --.

UNITED STATES PATENT AND TRADEMARK OFFICE
CERTIFICATE OF CORRECTION

PATENT NO. : 6,512,552 B1
DATED : January 28, 2003
INVENTOR(S) : Subramanian

It is certified that error appears in the above-identified patent and that said Letters Patent is hereby corrected as shown below:

<u>Column 12,</u>
Line 5, reads "SPU' of the" and should read -- SPU's of the --.

This certificate supersedes Certificate of Correction issued July 15, 2003.

Signed and Sealed this

Twenty-sixth Day of August, 2003

JAMES E. ROGAN
*Director of the United States Patent and Trademark Office*